Aug. 4, 1964   F. E. BLOUNT   3,142,868
FLANGING TOOL

Filed July 2, 1962   2 Sheets-Sheet 1

United States Patent Office 3,142,868
Patented Aug. 4, 1964

3,142,868
FLANGING TOOL
Floyd E. Blount, Dallas, Tex., assignor to Socony Mobil Oil Company, Inc., a corporation of New York
Filed July 2, 1962, Ser. No. 206,993
6 Claims. (Cl. 18—19)

This invention relates to a flanging tool and more particularly it relates to a tool for forming flnages on plastic pipe.

The installation of a plastic liner or pipe within a metal pipeline is frequently necessary or desirable for a number of reasons. One reason is to repair a pipeline which has developed apertures through which the conveyed fluid is lost. Another reason is to protect a metal pipeline from internal corrosion resulting from the corrosivity of the conveyed fluid toward the metal from which the pipeline is constructed.

Plastic pipe to be installed within a metal pipeline is usually constructed of a thermoplastic material. It is most desirable to utilize a thermoplastic material because the material may be heated until it becomes soft and then formed to the desired shape. The formed shape must be supported until the plastic cools and returns to its original consistency so that it will retain such shape. Suitable thermoplastic materials include, for example, polyethylene, polyvinyl chloride, polyvinyl chloride-acetate, polystyrene and copolymers of polystyrene.

The plastic pipe is provided with flanges at its ends so that a fluid-tight connection can be made between the plastic pipe and the metal pipeline by utilizing the flanges on the plastic pipe as a gasket between conventional flange fittings carried on the metal pipeline.

The flanges can be formed on a plastic pipe manufactured from a thermoplastic material by utilizing mechanical devices capable of producing the necessary steps of heating, forming, supporting, and cooling.

The known mechanical devices for forming flanges on plastic pipes are not suited for use under severe conditions. These devices are often used in remote locations where electrical or other power sources are difficult to obtain or in cramped quarters such as in small work areas excavated to expose a pipeline buried deeply within the earth. Further, there are occasions where use of power-driven or -operated flange-forming devices are prohibited for reason of safety. For example, in work areas having an atmosphere containing sufficient amounts of combustible vapors to form explosive mixtures, the use of such devices would be hazardous. Further, regardless of the conditions under which the flange is formed, the flange on the plastic pipe must reside closely adjacent to the flange fitting on the metal pipeline. Additionally, the flange must be formed perpendicular to the longitudinal axis of the pipeline for a fluid-tight joint to be made in the metal pipeline. In the absence of a proper joint, the plastic pipe tends to be distorted during assembly of the flange joints on the pipeline and, as a result, the pipe will not provide satisfactory service.

It is therefore an object of the present invention to provide a flanging tool for forming flanges on thermoplastic pipe. Another object of this invention is to provide a flanging tool in accordance with the preceding object that is safe to use in atmospheres containing combustible vapors. Another object of this invention is to provide a flanging tool for forming flanges on thermoplastic pipe that is compact, simple to construct, and convenient to operate even in the remote locations or under severe operating conditions. Another object of this invention is to provide a flanging tool for forming a flange on a thermoplastic pipe that is installed within a metal pipeline so that the flange is disposed in a plane perpendicular to the longitudinal axis of the thermoplastic pipe. Another object of this invention is to provide a flanging tool for forming flanges on thermoplastic pipe that is inserted in a metal pipeline so that the flange resides closely adjacent to the flange fitting on the metal pipeline.

These and other objects of this invention will become more apparent when read in conjunction with the following detailed description, the claims, and the attached drawing wherein there is shown an illustrative embodiment of the present invention.

In the drawings which are to be read in conjunction with the instant specification and which constitute a part thereof, and wherein the same parts will be designated by like numerals in the various views:

FIG. 1 is a vertical section of plastic pipe installed in a metal pipeline buried in the earth.

Figure 6:
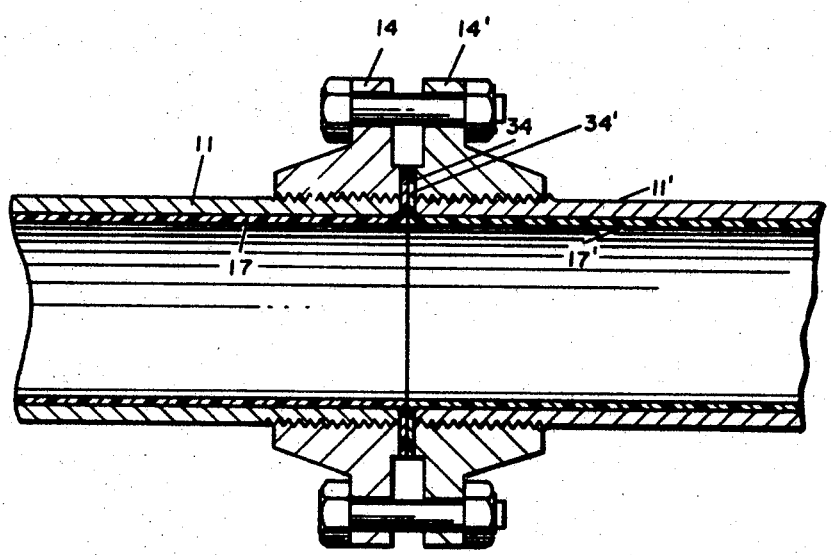
FIG. 6 is a vertical section through a flange joint in the metal pipeline in which the flanges formed on the ends of the plastic pipe provide a gasket between and coextensive with the raised faces of the conventional flange fittings on the metal pipeline.

Referring now to the figures, there is shown in FIG. 1 an illustrative example of one environment in which the flanging tool of the present invention can be used with great facility. A metal pipeline 11 is buried deeply within the earth. Small work areas 12 and 13 have been excavated to exposed the pipeline 11 for repairs. A flange fitting 14 is threadedly connected to an end 16 of such pipeline 11. The other end of the pipeline 11 is also provided with such flange fitting (not shown). A thermoplastic pipe 17 is inserted through the pipeline 11 and extends beyond both of its ends. Flanges are to be formed on the ends of the thermoplastic pipe 17 so that fluid-tight joints can be provided between the flange fittings on pipeline 11 as seen in FIG. 6. The flanges are of a radial dimension sufficient to cover the raised faces on the flange fittings.

Some of the problems of forming flanges on the thermoplastic pipe 17 are apparent from FIG. 1 where, as a means of illustration, the pipeline 11 is located in a remoted location where electrical or other conventional power sources are not readily obtainable, and where the flanges must be formed on the thermoplastic pipe 17 by an operator positioned within the small work area 12 or 13.

Figure 2:
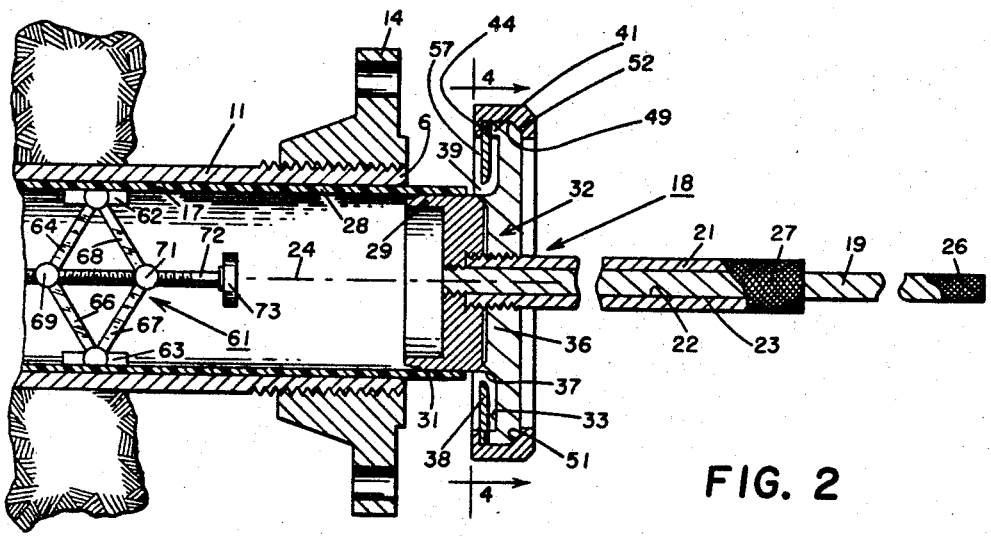
FIG. 2 is a vertical section of a flanging tool constructed in accordance with this invention and operably positioned at one end of the plastic pipe shown in FIG. 1.

Referring now to FIG. 2, a detailed description of one illustrative embodiment of the flanging tool 18 of the present invention will be given. The flanging tool 18 has inner and outer telescoping members 19 and 21, respectively. The inner member 19 may be cylindrical and outer member 21 may be tubular. The inner and outer telescoping members 19 and 21 are arranged so that the outer member 21 can be mounted and removed over one end of the inner member 19. The confronting surfaces 22 and 23 of the inner and outer members 19 and 21, respectively, provide bearing means for journaling said members for longitudinal movement relative to one another. Of course, such movement is along the longitudinal axis 24 of the members 19 and 21 so that they can be telescoped.

The inner and outer members 19 and 21 are of sufficient length to serve as handles by which the operator can grip them. The extremities of the inner and outer members 19 and 21 may be provided with serrated surfaces 26 and 27, respectively, if desired, to facilitate gripping.

The inner member 19 is provided with a pipe centering means mounted at one of its ends for slidably engaging the inner surface 28 of the thermoplastic pipe 17 received thereon to position the pipe in concentric alignment with the longitudinal axis 24 of the inner and outer members 19 and 21. The pipe centering means is provided by a cylindrical mandrel 29 concentrically mounted on the inner member 19 and having a side exterior surface 31 adapted to slidably engage the inner surface 28 of the thermoplastic pipe 17. The side exterior surface 31 of the mandrel 29 engages the thermoplastic pipe 17 for a distance at least substantially equal to the width of the flange to be formed on the thermoplastic pipe 17. Thus, the mandrel 29 coaxially aligns the inner member 19 with the longitudinal axis of the pipe.

Mounted on the outer member 21 is a means for flaring the end of the thermoplastic pipe 17 radially outwardly to form a flange when the pipe is heated to a temperature sufficient to soften it. Further, such means hold the flange rigidly against displacement until the thermoplastic pipe 17 cools sufficiently that the flange will retain its shape without external support. Such means are provided by a molding head 32 carried on the outer member 21 and provided with a plane surface 33 perpendicular to the longitudinal axis 24 of the inner and outer members 19 and 21. The plane surface 33 has radial dimensions such that, as can be best seen in FIG. 3, the flange 34 formed on the thermoplastic pipe 17 is supported throughout its extent by such plane surface 33. The molding head 32 may be of any material that will serve as a heat reservoir, for example, a metallic substance such as brass. The molding head 32, further, preferably has a sufficient mass which, when heated to a temperature of between about 250° F. and about 350° F., can store a sufficient quantity of heat at such temperatures to soften the end of the thermoplastic pipe 17 so that it can be flared or flexed outwardly to form the flange 34. The molding head 32 may take the form of a metal disk constructed of brass and concentrically mounted on the outer member 21 adjacent one of its ends. Inasmuch as brass is non-sparking metal when struck against a ferrous metal, the possibility of a spark being generated, as the flanging tool 18 is used, is greatly reduced.

A truncated forcing cone 36 having a divergent surface 37 is integrally carried by the molding head 32 and extends coaxially from the plane surface 33 to the end of the outer member 21. The forcing cone 36 has a diameter at its terminus most remote from the molding head 32 at least as small as the inside diameter of the thermoplastic pipe 17. The remainder of the forcing cone 36 has progressively larger diameters until the divergent surface 37 of the forcing cone 36 merges through a smooth curve with the plane surface 33 on the molding head 32.

A means is provided to support the flange 34 as it is formed against the plane surface 33 until the flange 34 cools sufficiently to be self-supporting. Such means is provided by an annular guide plate 38 disposed adjacent the plane surface 33. The guide plate 38 has an axially aligned central opening 39 of such dimension that it will pass over the thermoplastic pipe 17. Inasmuch as the guide plate 38 serves merely as a support, it can be fabricated of relatively thin sheet metal. A thickness of 1/8 inch is more than ample. The guide plate 38 is separated from the plane surface 33 on the molding head 32 by spacing means interposed therebetween. The spacing means is conveniently provided by recessing the molding head 32 to form the plane surface 33 into the side exterior face of the molding head 32. Formation of the plane surface 33 by this method provides an outer peripheral ridge 41 about the side exterior surface of the molding head 32. The depth to which the molding head 32 is recessed is at least equal to the wall thickness of the thermoplastic pipe 17.

The guide plate 38 is preferably formed from a pair of semicircular members 42 and 43 so as to be more easily removed from about the thermoplastic pipe 17 after the flange 34 is formed thereon. Further, there may be provided a peripheral lip 44 about the guide plate 38. The lip 44 is adapted to receive the ridge 41 so as to assist in mounting the guide plate 38 on the molding head 32. Of course, regardless of the mode of spacing the plane surface 33 and the guide plate 38, they are spaced apart a sufficient distance to receive the flange 34 as it is formed on the thermoplastic pipe 17.

Figure 4:
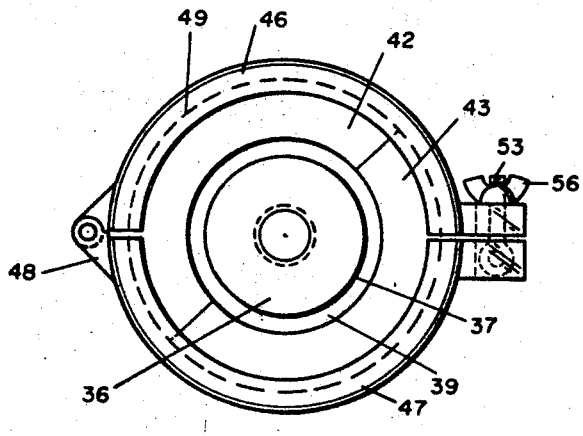
FIG. 4 is an elevation taken along line 4—4 of FIG. 2.
Figure 5:
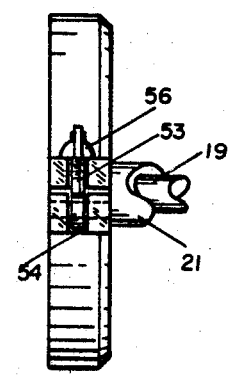
FIG. 5 is a side view of the structure shown in FIG. 4.

Means to clamp the guide plate 38 to the molding head 32 is provided on flanging tool 18. As best seen in FIGS. 4 and 5, the clamping means is provided by a pair of semiannular rings 46 and 47 movably joined by a hinge 48 at one corner and a locking means for releasably securing the rings together at the other corner. The rings 46 and 47 each have a groove 49 formed in the interior surface thereof. The groove 49 is of a sufficient size to accommodate the periphery of the guide plate 38 and the molding head 32. Thus, when the rings 46 and 47 are secured about these parts, they are operably held together. It is preferred to bevel a side 51 of the groove 49 and provide a complementary beveled surface 52 on the molding head so that there is a wedging action applied by the rings 46 and 47 to the molding head 32 and guide plate 38 to clamp them together. The locking means holding the rings 46 and 47 together may be provided by a bolt 53 pivoted to the ring 47 and adapted to swing into a guideway 54 on the other ring 46. A wing nut 56 is threaded onto the bolt 53 to lock the rings 46 and 47 together. The rings 46 and 47 are readily opened after loosening the wing nut 56 on bolt 53 and swinging the bolt 53 out of the guideway 54.

The rings 46 and 47 are provided with a side exterior opening 57 at least as large as the flange 34 formed on the thermoplastic pipe 17. This arrangement is of an advantage when it is desired to form the flange 34 closely adjacent the face of the flange fitting 14 mounted on the metal pipeline 11, as will be apparent from viewing FIG. 3. Other means to secure the guide plate 38 on the molding head 32 can be used, if desired.

Figure 3:
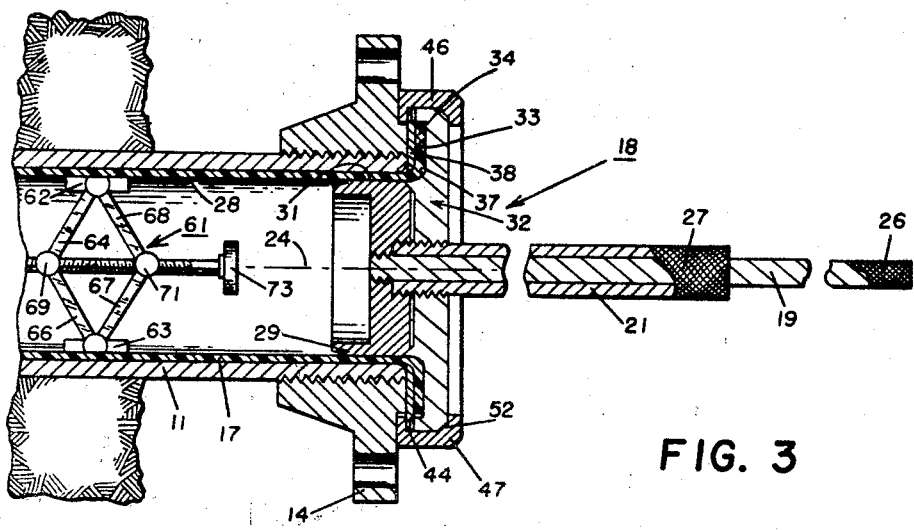
FIG. 3 is the view of FIG. 2 but with the flanging tool having formed a flange on the end of the plastic pipe.

The flanging tool 18 is used in the following manner to produce the flange 34 on the thermosplastic pipe 17. Referring now to FIGS. 1, 2, and 3, the thermoplastic pipe 17 is anchored at its end 58 to the metal pipeline 11 and the end 59 is pulled away from flange fitting 14 a slight distance to place the thermoplastic pipe 17 in tension. The end 59 is then anchored to the metal pipeline 11. One convenient anchor is provided by the double screw toggle press 61 shown in FIGS. 2 and 3. However, other means to anchor the thermoplastic pipe 17 to the pipeline 11 can be used.

The press 61 is comprised of a pair of wall engaging shoes 62 and 63 connected by toggle links 64, 66, 67, and 68. Links 64 and 68 are pivoted to shoe 62 and links 67 and 66 are pivoted to shoe 63. The links 64 and 66 are pivoted to a nut 69 and the links 67 and 68 are pivoted to a nut 71. A double-threaded screw 72 is threaded through nuts 69 and 71. The double screw 72 has threads at one end that are left-handed and at its other end that are right-handed. Thus, turning the screw 72 by means of operating handle 73 in one direction causes the shoes 62 and 63 to expand. Reverse rotation of the screw 72 retracts the shoes 62 and 63.

The press 61 is inserted into the thermoplastic pipe 17 while it is in tension, and operated to urge the shoes 62 and 63 outwardly so that the walls of the thermoplastic pipe 17 are pressed into nonslipping engagement with the inner surface of the metal pipeline 11.

With the inner and outer members 19 and 21 separated, the inner member 19 is inserted into the thermoplastic pipe 17 to the position shown in FIG. 2. The outer member 21 is assembled so that the guide plate 38 is mounted thereon and secured to the molding head 32 by the rings 46 and 47. The molding head 32 is heated by any suitable means, such as a small propane fueled torch, to a temperature sufficient to soften the thermoplastic pipe 17. This heating is carried out away from the work area 12 and, thus, there is no danger of explosion when explosive vapors are present adjacent the pipeline 11. The temperature to soften the thermoplastic pipe 17 is usually between 250° F. and 350° F. The end of the thermoplastic pipe 17 may be heated directly to a temperature sufficient to soften it, if it is not desired to heat only the molding head 32, or for other reasons.

After heating, the outer member 21 is passed over the inner member 19, as seen in FIG. 2, until the forcing cone 36 engages the cylindrical mandrel 29. Then, the inner and outer members 19 and 21 are moved as a unit to the position shown in FIG. 3 with the guide plate 38 abutting the face of the flange fitting 14. The flange 34 is formed perpendicular to the longitudinal axis of the thermoplastic pipe 17 and pipeline 11 as a result of the previously described arrangement of the plane surface 33 on the molding head 32 and the aligning action of the mandrel 29 on the thermoplastic pipe 17. The flanging tool 18 rapidly cools the flange 34 due to the intimate contact between the guide plate 38 and the rings 46 and 47 with the flange fitting 14. However, the flanging tool 18 may be cooled more quickly by application of a coolant, such as water.

After the flange 34 is cooled sufficiently to be self-supporting, wing nut 56 is loosened and the rings 46 and 47 are removed from about the molding head 32. The outer and inner members 19 and 21 are removed from the thermoplastic pipe 17. The guide plate 38 is then easily removed.

The press 61 is removed and the tension of the thermoplastic pipe 17 causes it to contract and thereby bring the flange 34 into tight abutment with the face of the flange fitting 14.

The process of using the flanging tool 18 of this invention is repeated on the ends of the thermoplastic pipe 17 at all of the adjoining sections of the metal pipeline 11. Any two adjacent metal pipeline sections are then easily joined by bolting the flange fittings 14 and 14' together with the flanges 34 and 34' on the thermoplastic pipe 17 providing the fluid-tight gasket therebetween as seen in FIG. 6.

From the foregoing, it will be seen that a flanging tool has been provided which achieves all of the objects of the present invention. While illustrative embodiments of the present invention have been fully disclosed, it will be understood that various changes may be made by those skilled in the art without departing from the spirit of the invention. Such changes are intended to be protected by this Letters Patent in all forms of the invention falling within the scope of the following claims.

What is claimed is:

1. A flanging tool for forming a flange on a thermoplastic pipe comprising inner and outer telescoping members, bearing means carried by at least one of said members for journaling said members for longitudinal movement relative to one another, a cylindrical mandrel concentrically mounted at one end of said inner member, said mandrel adapted to receive a pipe thereon and to slidably engage the inner surface of the pipe for a distance substantially equal to the width of the flange to be formed on such pipe, a molding head carried on the outer member and provided with a plane surface facing the mandrel and perpendicular to the longitudinal axis of said members, said plane surface having radial dimensions sufficient to receive the flange formed on a pipe, a forcing cone integrally carried by said molding head in coaxial alignment with the longitudinal axis of said inner member and extending from the plane surface on said molding head toward said mandrel, said forcing cone having a diverging surface, the terminus of said cone remote from the plane surface having a diameter at least as small as the inside diameter of a pipe received on the mandrel and the remainder of such cone having progressively greater diameters until the divergent surface of the cone merges with the plane surface on said molding head, an annular guide plate disposed adjacent the plane surface and provided with a central opening therethrough of sufficient dimensions to pass over a pipe received upon said mandrel, spacing means interposed between the plane surface on the molding head and the guide plate for separating the plane surface and the guide plate apart a distance at least equal to the thickness of a pipe received on the mandrel, and clamping means for securing the guide plate to said molding head.

2. The flanging tool of claim 1 wherein the clamping means is comprised of a pair of semiannular rings movably joined by a hinge at one corner and a locking means for releasably securing together the annular rings at their other corner, said rings having a groove formed in the interior surface thereof and said groove being of size sufficient to accommodate the peripheries of said guide plate and molding head, and a side of said groove confronting the molding head being beveled whereby locking the clamping means about the guide plate and molding head securely urges said guide plate and molding head into intimate engagement.

3. The flanging tool of claim 2 wherein the clamping means is provided with a central side exterior opening at least as large as the flange formed on a pipe received on the mandrel.

4. A flanging tool for forming a flange on a thermoplastic pipe comprising inner and outer telescoping members, bearing means carried by at least one of said members for journaling said members for longitudinal movement relative to one another, a pipe centering means mounted at one end of said inner member for slidably engaging the inner surface of a pipe received thereon whereby said pipe is positioned in concentric alignment with the longitudinal axis of the inner member, a molding head mounted on the outer member, a forcing cone carried on the molding head in coaxial alignment with the longitudinal axis of the inner member, said forcing cone having a diverging surface, the terminus of the cone remote from the molding head having a diameter at least as small as the inside diameter of a pipe received on said centering means and the remainder of the cone having progressively greater diameters, a guide plate positioned on the molding head in a plane perpendicular to the longitudinal axis of the outer member, said guide plate provided with an axially aligned central opening therethrough of sufficient dimension to pass over a pipe received upon the centering means, clamping means for releasably securing the guide plate to the molding head, said molding head being recessed to provide an annular plane surface perpendicular to the longitudinal axis of said outer member and spaced from the guide plate a distance at least equal to the wall thickness of the pipe received on the centering means, and said plane surface merging with the divergent surface of said forcing cone.

5. A flanging tool for forming a flange on a thermoplastic pipe comprising a cylindrical member, a cylindrical mandrel concentrically mounted on said cylindrical member at one of its ends, a tubular member mounted on said cylindrical member, bearing means carried by one of said members for journaling said members for telescopic movement relative to one another, a disk concentrically mounted on said tubular member adjacent one of its ends, a forcing cone integrally carried by said disk and extending coaxially from said disk toward the end of said tubular member, said forcing cone having a diverging surface, the terminus of the cone remote from the disk having a diameter at least as small as the inside diameter of a pipe received on the mandrel and the remainder of the cone having progressively larger diameters, said disk provided with an outer peripheral ridge about its side exterior surface which faces said forcing cone, a guide plate comprised of a pair of semicircular members and having a peripheral lip adapted to receive said ridge on said disk, said guide plate positioned on the disk and provided with a central opening therethrough of sufficient dimension to pass over a pipe received in said mandrel, said ridge on the disk and the lip on the guide plate cooperating to space the adjacent side exterior surfaces of the disk and the guide plate from one another a distance at least equal to the thickness of a pipe received on the mandrel, and clamping means for releasably securing the guide plate to the disk.

6. A flanging tool for forming a flange on a thermoplastic pipe comprising inner and outer telescoping members, bearing means carried by at least one of said members for journaling said members for longitudinal movement relative to one another, a pipe centering means mounted at one end of said inner member for slidably engaging the inner surface of a pipe received thereon whereby said pipe is positioned in concentric alignment with the longitudinal axis of the inner member, a molding head carried on the outer member and provided with a plane surface facing the pipe centering means and perpendicular to the longitudinal axis of said members, said plane surface having radial dimensions sufficient to receive the flange formed on a pipe, a forcing cone integrally carried by said molding head in coaxial alignment with the longitudinal axis of said inner member and extending from the plane surface on said molding head toward said pipe centering means, said forcing cone having a diverging surface, the terminus of said cone remote from the plane surface having a diameter at least as small as the inside diameter of a pipe received on the pipe centering means and the remainder of such cone having progressively greater diameters until the divergent surface of the cone merges with the plane surface on said molding head, an annular guide plate disposed adjacent the plane surface and provided with a central opening therethrough of sufficient dimensions to pass over a pipe received upon said pipe centering means, spacing means interposed between the plane surface on the molding head and the guide plate for separating the plane surface and the guide plate apart a distance at least equal to the thickness of a pipe received on the pipe centering means, and clamping means for securing the guide plate to said molding head.

References Cited in the file of this patent
UNITED STATES PATENTS

| 2,635,287 | Taper | Apr. 21, 1953 |
| 2,823,418 | Fritts | Feb. 18, 1958 |